(12) United States Patent
Hu

(10) Patent No.: US 11,705,581 B2
(45) Date of Patent: Jul. 18, 2023

(54) BATTERY AND BATTERY FABRICATION METHOD

(71) Applicant: Lenovo (Beijing) Co., Ltd., Beijing (CN)

(72) Inventor: Yu Hu, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 709 days.

(21) Appl. No.: 16/587,272

(22) Filed: Sep. 30, 2019

(65) Prior Publication Data

US 2020/0106123 A1 Apr. 2, 2020

(30) Foreign Application Priority Data

Sep. 30, 2018 (CN) .......................... 201811157633.8

(51) Int. Cl.
| | |
|---|---|
| *H01M 10/058* | (2010.01) |
| *H01M 10/0525* | (2010.01) |
| *H01M 10/42* | (2006.01) |
| *H01M 10/0585* | (2010.01) |
| *H01M 50/609* | (2021.01) |
| *H01M 50/682* | (2021.01) |

(52) U.S. Cl.
CPC ..... *H01M 10/058* (2013.01); *H01M 10/0525* (2013.01); *H01M 10/0585* (2013.01); *H01M 10/4235* (2013.01); *H01M 50/609* (2021.01); *H01M 50/682* (2021.01)

(58) Field of Classification Search
CPC .......................... H01M 50/673; H01M 50/682
See application file for complete search history.

(56) References Cited

U.S. PATENT DOCUMENTS

| 2,500,169 | A | * | 3/1950 | Ellis | ..................... | H01M 50/609 |
| | | | | | | 429/74 |
| 2007/0154803 | A1 | * | 7/2007 | Kim | ..................... | H01M 50/627 |
| | | | | | | 429/185 |
| 2011/0200855 | A1 | * | 8/2011 | Watanabe | ............. | H01M 50/10 |
| | | | | | | 29/623.2 |

(Continued)

FOREIGN PATENT DOCUMENTS

| CN | 102593525 A | 7/2012 |
| CN | 103165940 A | 6/2013 |

(Continued)

OTHER PUBLICATIONS

Machine translation of CN 103811711 A (Year: 2014).*
Machine translation of CN 106654355 A (Year: 2017).*

*Primary Examiner* — Robert S Carrico
(74) *Attorney, Agent, or Firm* — Anova Law Group, PLLC

(57) ABSTRACT

The present disclosure provides a battery. The battery includes a separation structure having a resistance greater than a resistance threshold; a positive electrode of the battery and a negative electrode of the battery disposed on two sides of the separation structure; a liquid conductor configured to transport conductive ions between the positive electrode and the negative electrode; a storage structure configured to store supplementary material to release into the liquid conductor; and an enclosure configured to form an enclosed cavity to accommodate the separation structure, the positive electrode, the negative electrode, the liquid conductor, and the storage structure.

8 Claims, 4 Drawing Sheets

(56) References Cited

U.S. PATENT DOCUMENTS

| | | | |
|---|---|---|---|
| 2013/0236792 A1* | 9/2013 | Terado | H01M 50/258 |
| | | | 429/246 |
| 2014/0028264 A1 | 1/2014 | Taniyama et al. | |
| 2018/0198118 A1 | 7/2018 | Amiruddin et al. | |

FOREIGN PATENT DOCUMENTS

| CN | 103390764 A | 11/2013 |
|---|---|---|
| CN | 103811711 A | 5/2014 |
| CN | 105449284 A | 3/2016 |
| CN | 106654355 A | 5/2017 |

\* cited by examiner

BATTERY AND BATTERY FABRICATION METHOD

CROSS-REFERENCES TO RELATED APPLICATIONS

This application claims the priority of Chinese Patent Application No. 201811157633.8, filed with the State Intellectual Property Office of P. R. China on Sep. 30, 2018, the entire content of which is incorporated herein by reference.

FIELD OF THE DISCLOSURE

The present disclosure generally relates to the field of battery technology and, more particularly, relates to a battery and a battery fabrication method.

BACKGROUND

As lithium-ion batteries are widely used, extending the battery life is an important issue.

BRIEF SUMMARY OF THE DISCLOSURE

The technical solution of the present disclosure includes the following structures and processes.

One aspect of the present disclosure provides a battery. The battery includes a separation structure having a resistance greater than a resistance threshold; a positive electrode of the battery and a negative electrode of the battery disposed on two sides of the separation structure; a liquid conductor configured to transport conductive ions between the positive electrode and the negative electrode; a storage structure configured to store supplementary material to release into the liquid conductor; and an enclosure configured to form an enclosed cavity to accommodate the separation structure, the positive electrode, the negative electrode, the liquid conductor, and the storage structure.

In some embodiments, the liquid conductor is in contact with the positive electrode material and the negative electrode material respectively to connect between the positive electrode and the negative electrode of the battery.

In some embodiments, in response to a force applied on the storage structure or the enclosure, the storage structure releases a first volume of the supplementary material; or the storage structure releases a second volume of the supplementary material at a set time interval.

In some embodiments, the storage structure is made of an insulating elastic material including at least one pore to absorb the supplementary material; and when the battery and/or the storage structure is subject to the gravitational force only, the supplementary material is not released into the liquid conductor.

In some embodiments, the supplementary material forms the same ions as the conductive ions.

In some embodiments, a thickness of the storage structure satisfies a condition that a compressed thickness when the storage structure is completely compressed corresponds to N times an expanded thickness when the positive electrode material and/or the negative electrode material are completely expanded, where N is greater than or equal to 1.

In some embodiments, the storage structure is disposed at any position in a direction the positive electrode material and/or the negative electrode material expands.

Another aspect of the present disclosure provides a battery fabrication method. The method includes performing a top-side encapsulation process to enclose a storage structure storing supplementary material, a separation structure, a positive electrode, and a negative electrode to form a top-side encapsulated battery cell; and performing processes of electrolyte injection and encapsulation to the top-side encapsulated battery cell.

In some embodiments, the method further includes calculating a volume of the supplementary material absorbed in the storage structure; and if the calculated volume is approximately equal to a volume threshold, stopping the storage structure from absorbing more supplementary material.

In some embodiments, injecting the electrolyte into the top-side encapsulated battery cell includes injecting a liquid conductor into the top-side encapsulated battery cell, where the supplementary material forms the same ions as conductive ions in the liquid conductor.

In some embodiments, the method further includes performing a pressurization process to the battery cell after the electrolyte injection and the encapsulation process.

In some embodiments, storing the supplementary material in the storage structure includes submerging an elastic material into an electrolyte tank; calculating a volume of the supplementary material adsorbed in the elastic material; and if the volume is approximately equal to a volume threshold, removing the elastic material from the electrolyte tank. The elastic material is a porous heat-conductive insulating elastic material.

In some embodiments, the liquid conductor is in contact with the positive electrode material and the negative electrode material respectively to connect between the positive electrode and the negative electrode of the battery.

In some embodiments, in response to an external force applied on the storage structure or an enclosure, the storage structure releases a first volume of the supplementary material; or the storage structure releases a second volume of the supplementary material at a time interval.

In some embodiments, the storage structure is made of an insulating elastic material including at least one pore to absorb the supplementary material; and when the battery and/or the storage structure is subject to the gravitational force, the supplementary material is not released into the liquid conductor.

In some embodiments, a thickness of the storage structure satisfies a condition that a compressed thickness when the storage structure is completely compressed corresponds with N times an expanded thickness when the positive electrode material and/or the negative electrode material are completely expanded, where N is greater than or equal to 1.

In some embodiments, the storage structure is disposed at any position in a direction the positive electrode material and/or the negative electrode material expands.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

To make the foregoing objectives, features and advantages of the present disclosure clearer and more understandable, the present disclosure will be further described with reference to the accompanying drawings and embodiments.

For convenience of description, in the description of the embodiments of the present disclosure, cross-sectional views showing device structures may be partially enlarged not to scale. Exemplary embodiments may be embodied in various forms and should not be construed as limited to the embodiments set forth herein. Rather, these embodiments are provided to fully convey the thorough and complete concepts of the exemplary embodiments to those skilled in the art. In addition, three-dimensional sizes including length, width, and depth should be included in an actual fabrication process.

Lithium-ion batteries are widely used in digital products such as laptop computers, smart phones, and tablet computers, and in renewable energy automobiles and energy storage systems. A lithium-ion battery includes two electrodes (positive and negative), a separation membrane that blocks electrons and passes lithium ions, an electrolyte that transports the lithium ions, and an enclosure functioned as an electrolyte container (e.g., a rigid cylindrical enclosure, a prismatic aluminum enclosure, or a soft polymer enclosure). During use of lithium-ion batteries, lithium ions and additives in the electrolyte are consumed, and an oxidation-reduction reaction occurs with the negative electrode and the positive electrode causing gradual irreversible battery capacity degradation. Eventually, the battery capacity drops below a certain threshold or specification. After a certain time of use, a user must replace the battery or discard the product containing the battery.

Figure 1:
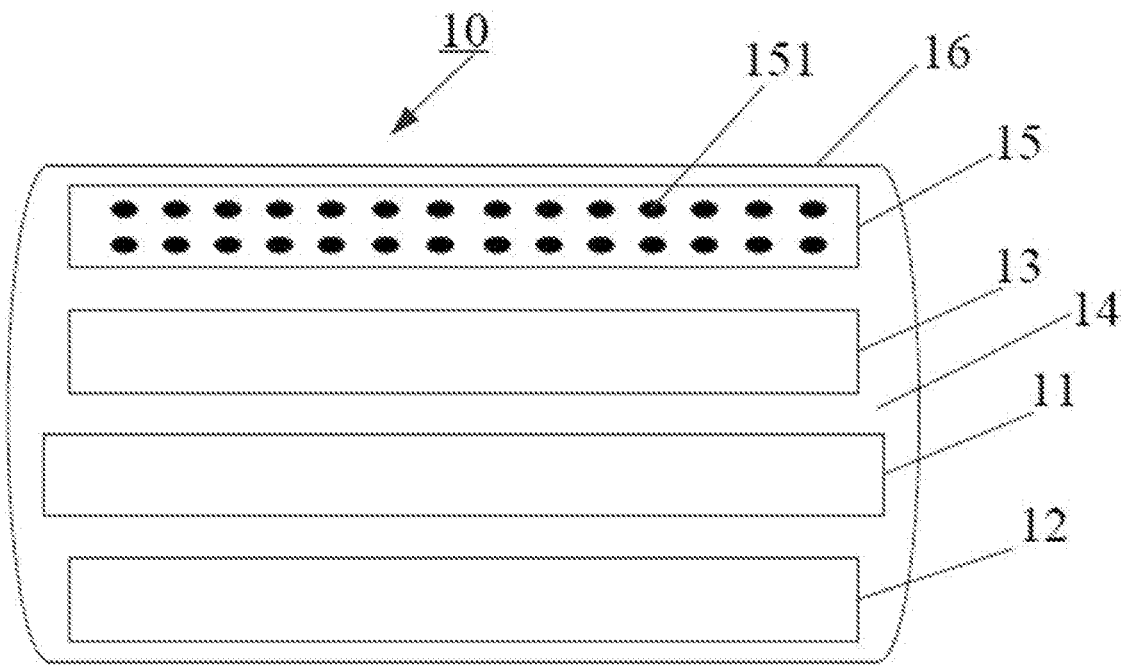
FIG. 1 illustrates a schematic diagram of an example of a battery according to some embodiments of the present disclosure.

The present disclosure provides a battery. FIG. 1 illustrates a schematic diagram of an example of a battery according to some embodiments of the present disclosure. As shown in FIG. 1, the battery 10 includes a separation structure 11, a positive electrode 12, a negative electrode 13, a liquid conductor 14, a storage structure 15, and an enclosure 16.

Each of the separation structure 11, the positive electrode 12, the negative electrode 13, and the storage structure 15 has a first side and a second side facing toward each other. The first side of the separation structure 11 is adjacent to the first side of the positive electrode 12. The second side of the separation structure 11 is adjacent to the first side of the negative electrode 13. The second side of the negative electrode 13 is adjacent to the first side of the storage structure 15. As such, the separation structure 11, the positive electrode 12, the negative electrode 13, and the storage structure 15 are disposed next to each other inside the battery 10.

Disposing the separation structure 11, the positive electrode 12, the negative electrode 13, and the storage structure 15 next to each other inside the battery 10 refers to disposing the separation structure 11, the positive electrode 12, the negative electrode 13, and the storage structure 15 next to each other without contacting each other. Gaps of a pre-set width exist between any two of the separation structure 11, the positive electrode 12, the negative electrode 13, and the storage structure 15. The liquid conductor 14 fills in the gaps. In addition, the separation structure 11, the positive electrode 12, the negative electrode 13, and the storage structure 15 all are fixedly attached to the inside of the battery enclosure 16. The battery structure shown in FIG. 1, which indicates logical relationships between the structures inside the battery 10, is for illustrative purposes, and is not intended to limit the present disclosure.

The separation structure 11 has two surfaces facing toward each other. A resistance between the two surfaces is greater than a pre-set value. The pre-set value is used to ensure the separation structure 11 is not conductive. The separation structure 11 is used to separate between the positive electrode 12 and the negative electrode 13.

In one embodiment, the separation structure 11 may be a solid insulation material or a hollow insulation material.

When the separation structure 11 is the hollow insulation material, a cavity of a pre-set volume is configured inside the separation structure 11. Inside the cavity is filled with vacuum or air. Alternatively, the cavity may be filled with a filler material for adjusting a weight of the separation structure 11.

If the cavity is filled with vacuum or air, the hollow insulation material may reduce the weight of the separation structure 11, thereby reducing the weight of a finished battery without compromising a size of the finished battery. If the cavity is filled with the filler material, the weight of the finished battery may be adjusted by changing a type of the filler material. As such, the weight of the finished battery may be adjusted under a uniform size of the finished battery.

In one embodiment, the cavity may be formed by machining a solid insulation material or may be formed at the same time as the separation structure 11 is formed.

In one embodiment, gaps of the pre-set width exist between at least one of other surfaces of the separation structure 11 other than the first side and the second side and the enclosure external to the separation structure 11. The gaps are filled with the liquid conductor 14 to provide conductivity between the positive electrode 12 and the negative electrode 13.

In one embodiment, the separation structure 11 may be a separation membrane that blocks electrons but passes conductive ions (e.g., lithium ions).

The positive electrode 12 and the negative electrode 13 are disposed on two sides of the separation structure 11 to form a positive electrode and a negative electrode of the battery 10. When charging the battery 10, the positive electrode 12 and the negative electrode 13 may be materials capable of extracting conductive ions from the positive electrode 12 and inserting the conductive ions into the negative electrode 13 through the liquid conductor 14, such that the conductive ions are accumulated with a high concentration at the negative electrode. When discharging the battery 10, the conductive ions may be extracted from the negative electrode 13 and may be inserted into the positive electrode 12 through the liquid conductor 14, such that the conductive ions are accumulated with the high concentration at the positive electrode.

For example, when the battery 10 is a lithium-ion battery, the positive electrode 12 and the negative electrode 13 of the lithium-ion battery may be two different lithium intercalation compounds capable of reversibly inserting and extracting lithium ions to form the positive electrode and the negative electrode of the battery 10. During battery charging, the lithium ions are extracted from crystal lattices of the positive electrode 12. After passing through the electrolyte, the lithium ions are inserted into the crystal lattices of the negative electrode 13, making the negative electrode lithium rich and the positive electrode lithium depleted. During battery discharging, the lithium ions are extracted from the negative electrode 13. After passing through the electrolyte, the lithium ions are inserted into the crystal lattices of the positive electrode 12, making the positive electrode lithium rich and the negative electrode lithium depleted. During the insertion and the extraction of the lithium ions, a difference between potentials of the positive electrode 12 and the negative electrode 13 relative to a metal lithium is an operating voltage of the battery 10. Moreover, the positive electrode 12 of the lithium-ion battery may be any one of a lithium cobaltate, a lithium manganate, a lithium iron phosphate, and a ternary material. The negative electrode 13 of the lithium-ion battery may be of any one of a carbon negative electrode material, a tin-based negative electrode material, a lithium-containing transition metal nitride negative electrode material, an alloy-based negative electrode material, and a nano-scale negative electrode material.

The liquid conductor 14 is the electrolyte of the battery 10 for effecting transmission of the conductive ions between the positive electrode and the negative electrode. In one embodiment, the liquid conductor 14 is a liquid mixture conductor.

When the battery is the lithium-ion battery, the liquid conductor 14 may be a lithium-ion battery electrolyte. For example, the lithium-ion battery may be a high temperature molten salt lithium battery, an organic electrolyte lithium battery, an inorganic nonaqueous electrolyte lithium battery, or a lithium/water battery. Correspondingly, the electrolyte may be a high temperature molten salt electrolyte (e.g., a molten carbonate electrolyte), an organic solvent electrolyte, an inorganic nonaqueous electrolyte, or an aqueous solution electrolyte (e.g., an electrolyte containing lithium hydroxide).

When the battery is a lead acid battery, the liquid conductor 14 may be an aqueous sulfuric acid solution prepared by mixing pure sulfuric acid and distilled water in a certain ratio.

The storage structure 15 is configured for storing supplementary material 151. The storage structure 15 releases the supplementary material 151 to increase the concentration of the conductive ions in the liquid conductor 14. Alternatively, when the concentration of the conductive ions in the liquid conductor 14 is reduced to lower than a pre-set threshold, the storage structure 15 releases a certain volume of the supplementary material 151 to supplement the conductive ions in the liquid conductor 14.

The supplementary material 151 is a material containing the same element as the conductive ions. For example, when the conductive ions are the lithium ions, the supplementary material 151 is a material containing the lithium element.

The supplementary material 151 may be a solid material or a liquid material.

When the supplementary material 151 is the solid material, the supplementary material 151 may be a solid powder. The solid powder may be released from the storage structure 15 to be dissolved and ionized in the liquid conductor 14 to form the conductive ions. As such, dissolving the supplementary material 151 into the liquid conductor 14 may increase the concentration of the conductive ions in the liquid conductor 14, thereby compensating the loss of the conductive ions and extending the battery life.

When the supplementary material 151 is the liquid material, the liquid material may be a solution containing the same ions and having the same ion concentration as the liquid conductor 14. That is, the supplementary material 151 is the solution identical to the liquid conductor 14. As such, releasing the supplementary material 151 from the storage structure 15 may increase the concentration of the conductive ions in the liquid conductor 14, thereby compensating the loss of the conductive ions in the liquid conductor 14 and extending the battery life.

The enclosure 16 is configured to form an enclosed or sealed cavity to accommodate the separation structure 11, the positive electrode 12, the negative electrode 13, the liquid conductor 14, and the storage structure 15.

In one embodiment, the enclosure 16 may be made of a rigid material. The enclosure 16 may be made of a material resistant to acid, heat, shock, desirably insulative, and having certain mechanical properties. The enclosure 16 may have a cylindrical or prismatic shape. The enclosure 16 may be a unitary structure. In one embodiment, the enclosure 16 may be any one of a rigid cylindrical enclosure, a prismatic aluminum enclosure, or a polymer soft enclosure.

The battery provided by the embodiments of the present disclosure includes the separation structure, the positive electrode, the negative electrode, the liquid conductor, the storage structure, and the enclosure. The storage structure stores the supplementary material. During the use of the battery, the storage structure releases the pre-set volume of the supplementary material to compensate the loss of the conductive ions in the liquid conductor, thereby extending the battery life.

Compared with the battery fabricated by adding too much electrolyte, the battery provided by the embodiments of the present disclosure may effectively restore the capacity of the battery cell without compromising the energy density of the battery cell. The implementation is simple and does not extend the length or the thickness of the battery cell. By controlling the thickness of the storage structure, the overall thickness of the battery cell during the battery use meets the desired specification.

Compared with the battery fabricated by reserving a cavity of a certain width for storing the electrolyte to be added in the future, the battery provided by the embodiments of the present disclosure requires a simple fabrication process and is easy to operate. The supplementary material is stored into the storage structure during the fabrication process of the battery cell without the need for a secondary electrolyte injection.

In another embodiment, the liquid conductor 14 contacts with the positive electrode 12 and the negative electrode 13, respectively, to connect between the positive electrode and the negative electrode of the battery, such that the positive electrode and the negative electrode of the battery are conductive. When the battery is charging, the conductive ions are extracted from the positive electrode 12 and are inserted into the negative electrode 13 after passing through the liquid conductor 14, such that the negative electrode has a high concentration of the conductive ions and the positive electrode has a low concentration of the conductive ions. When the battery is discharging, the conductive ions are extracted from the negative electrode 13 and are inserted into the positive electrode 12 after passing through the liquid conductor 14, such that the positive electrode has a high concentration of the conductive ions and the negative electrode has a low concentration of the conductive ions.

In another embodiment, the storage structure 15 stores the supplementary material 151. When the storage structure 15 or the enclosure 16 is subject to an additional force, the storage structure 15 releases a first pre-set volume of supplementary material 151.

In this case, the additional force does not include the gravitational force. The additional force on the storage structure 15 may be transferred from the battery enclosure 16 that is squeezed by an external force or may be a squeezing force due to expansion of the battery cell. The additional force on the enclosure 16 may be an additional force resulted from the external force squeezing the enclosure 16.

In one embodiment, when the storage structure 15 is squeezed by the additional force, the outer casing of the storage structure 15 is partially deformed, and the additional force is transferred to the inside of the storage structure 15. As such, the supplementary material 151 stored in the storage structure 15 is squeezed out of the storage structure 15.

For example, a pressing mark is printed on an external surface of the battery enclosure 16. The pressing mark indicates a pressing position corresponding to the storage structure 15. When the user squeezes the pressing position indicated by the pressing mark, the battery enclosure 16 deforms and transfers the squeezing force to the storage structure 15 to cause the outer casing of the storage structure 15 to partially deform, thereby squeezing the supplementary material 151 out of the storage structure 15.

In another embodiment, the storage structure 15 include at least one sealed storage unit. The at least one storage unit stores the supplementary material. When subject to an external force, the at least one storage unit may be broken or may be punctured by a pointy object. The at least one sealed storage unit may be sequentially disposed in a direction the battery cell expands. Further, there is at least one pointy object inside the battery. The pointy object is disposed corresponding to the direction the battery cell expands. In response to the expansion of the battery cell, the pointy object moves in the expansion direction. When the pointy object moves to any one of the at least one storage unit, the pointy object punctures the sealed storage unit, such that the supplementary material stored in the sealed storage unit is released.

For example, the sealed storage unit may be a sealed bag. A plurality of sealed bags is included in the battery. The plurality of sealed bags is stacked inside the battery enclosure 16 and is sequentially arranged in the direction the battery cell expands. In response to the expansion of the battery cell, the pointy object may puncture the sealed bags one by one. For example, as the battery cell expands, the pointy object disposed on the battery cell first punctures a first sealed bag to gradually release the supplementary material 151. As the battery cell continues to expand, the pointy object disposed on the battery cell penetrates through the first sealed bag. As the battery cell expands further, the battery cell punctures a second sealed bag to gradually release the supplementary material 151. As the battery cell continues to expand, the pointy object disposed on the battery cell penetrates the second sealed bag until the pointy object penetrates all the sealed bags.

In one embodiment, the storage structure 15 releases the first pre-set volume of the supplementary material 151. The storage structure 15 determines the first pre-set volume according to a magnitude of the additional force and releases the first pre-set volume of the supplementary material 151 accordingly.

In this case, the larger the additional force is, the larger the deformation caused by the squeezing of the storage structure 15 is, and the more the supplementary material 151 is released, that is, the larger the first pre-set volume is. The smaller the additional force is, the smaller the deformation caused by the squeezing of the storage structure 15 is, hence the less the supplementary material 151 is released, that is, the smaller the first pre-set volume is.

In another embodiment, the storage structure 15 stores the supplementary material 151. The storage structure 15 releases a second pre-set volume of the supplementary material 151 at a pre-set time interval.

In this case, the storage structure 15 may release the supplementary material 151 at a certain frequency. For example, the supplementary material 151 is released once every month. In one embodiment, the pre-set time interval may be determined according to the performance and usage of the battery, and is configured at the time of production, which is not limited by the present disclosure.

In one embodiment, the storage structure 15 releases a certain volume of the supplementary material 151 each time. The volume of the supplementary material 151 released each time may be the same or different. For example, the second pre-set volume of the supplementary material 151 released by the storage structure 15 may be gradually increased or gradually decreased or increased and decreased alternately. For example, the storage structure 15 releases a volume V1 in a first release, a volume V2 in a second release, the volume V1 in a third release, the volume V2 in a fourth release, and so on so forth.

The battery provided by the embodiments of the present disclosure may include a built-in control unit. The control unit is configured to control the time and volume of releasing the supplementary material 151. The storage structure 15 releases the supplementary material 151 according to the time and volume set by the control unit.

In one embodiment, the control unit us further configured to detect a remaining amount of the liquid conductor 14 in the battery and/or the concentration of the conductive ions in the liquid conductor 14. When the remaining amount of the liquid conductor 14 is lower than a first pre-set threshold, the control unit may control the storage structure 15 to release a pre-set volume of the supplementary material 151 and/or when the concentration of the conductive ions in the liquid conductor 14 is lower than a second pre-set threshold, the control unit may control the storage structure 15 to release the pre-set volume of the supplementary material 151.

In another embodiment, the storage structure 15 is made of an electrically insulated elastic material. The elastic material includes at least one hole for filling the supplementary material 151.

In one embodiment, the storage structure 15 is made of an elastic material, which may deform when subject to an external squeezing force, and/or the storage structure 15 is made of an electrically insulated material, which may be electrically insulated from the positive electrode or the negative electrode when the storage structure 15 is disposed inside the battery, and/or the storage structure 15 is made of a porous material, which includes a plurality of holes having a uniform diameter or an identical diameter for filling the supplementary material 151, and/or the storage structure 15 is made of a heat conductive material, which avoids performance degradation of the storage structure 15 due to the battery heat dissipation by dissipating the heat inside the battery when the storage structure 15 is disposed inside the battery.

In the battery provided by the embodiments of the present disclosure, the supplementary material 151 may not enter into the liquid conductor 14 when the battery and/or the storage structure 15 is subject to the gravitational force. That is, the supplementary material 151 may not be released into the liquid conductor 14 when the battery and/or the storage structure 15 is subject to the gravitational force.

In another embodiment, the supplementary material 151 is capable of forming the same ions as the conductive ions.

In this case, the supplementary material 151 can form the same ions as the conductive ions. For example, when the conductive ions are lithium ions, the supplementary material 151 can form the lithium ions.

The supplementary material may be a solid material or a liquid material.

When the supplementary material 151 is the solid material, the supplementary material 151 may be a solid powder. The solid powder may be released from the storage structure 15 to be dissolved and ionized in the liquid conductor 14 to form the conductive ions. As such, dissolving the supplementary material 151 into the liquid conductor 14 may increase the concentration of the conductive ions in the liquid conductor 14, thereby compensating the loss of the conductive ions and extending the battery life.

When the supplementary material 151 is the liquid material, the liquid material may be a solution containing the same ions and having the same ion concentration as the liquid conductor 14. That is, the supplementary material 151 is the solution identical to the liquid conductor 14. As such, releasing the supplementary material 151 from the storage structure 15 may increase the concentration of the conductive ions in the liquid conductor 14, thereby compensating the loss of the conductive ions in the liquid conductor 14 and extending the battery life.

In another embodiment, the thickness of the storage structure 15 satisfies a pre-set condition.

In this case, the pre-set condition may be that a compressed thickness when the storage structure 15 is completely compressed matches N times an expanded thickness when the positive electrode 12 and/or the negative electrode 13 are completely expanded, where N is greater than or equal to 1. When N is equal to 1, the compressed thickness of the completely compressed storage structure 15 is the same as the expanded thickness of the completely expanded positive electrode 12 and/or negative electrode 13. When N is greater than 1, the compressed thickness of the completely compressed storage structure 15 is N times the expanded thickness of the completely expanded positive electrode 12 and/or negative electrode 13. In this case, if the storage structure 15 is completely compressed and the positive electrode 12 and/or the negative electrode 13 are completely expanded, the compressed storage structure 15 may leave some residual space inside the battery due to the compression.

In one embodiment, the pre-set condition may also be that when the storage structure 15 is completely compressed, the internal space inside the battery enclosure 16 can still accommodate the maximumly expanded battery cell.

In another embodiment, the storage structure 15 is disposed at any position in the direction the positive electrode 12 and/or the negative electrode 13 expand.

Because the positive electrode 12 and/or the negative electrode 13 of the battery may gradually expand during the use of the battery, the storage structure 15 may be disposed at any position in the direction the positive electrode 12 and/or the negative electrode 13 expand. As such, the expanded positive electrode 12 and/or the negative electrode 13 may be used to compress the storage structure 15 to release the supplementary material 151 stored in the storage structure 15.

Figure 2:
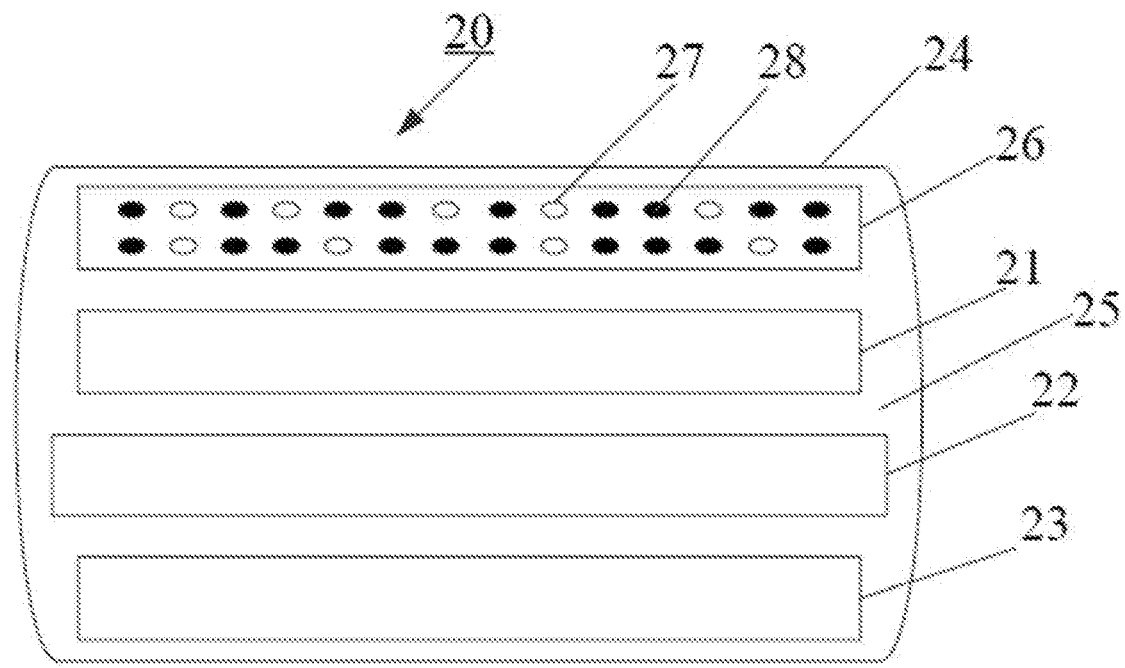
FIG. 2 illustrates a schematic diagram of another example of a battery according to some embodiments of the present disclosure.

FIG. 2 illustrates a schematic diagram of another example of a battery according to some embodiments of the present disclosure. The embodiments of the present disclosure replenish the electrolyte in real time through a particular design.

As shown in FIG. 2, the battery 20 include a positive electrode 23 and a negative electrode 21 disposed inside a battery enclosure 24. The positive electrode 23 and the negative electrode 21 of the battery 20 are separated by a separation membrane 22. In a direction the positive electrode 23 and the negative electrode 21 of the battery 20, a layer of porous liquid-absorbing heat-conductive insulating elastic material 26 is added. The elastic material 26 stores and absorbs a portion of the additional electrolyte 28. As shown in FIG. 2, the black dots represent the additional electrolyte 28 absorbed in the pores 27 of the elastic material 26. During the battery fabrication process, the layer of the elastic material 26 fully absorbed with the additional electrolyte 28 is added inside the battery enclosure 24. During the expansion process due to the battery use, the thickness of the electrodes increases, thereby compressing the layer of the elastic material 26. The additional electrolyte 28 is squeezed out of the pores 27 of the porous elastic material 26. Regarding the pores 27 in FIG. 2, the white dots represent the pores 27 that do not absorb the additional electrolyte 28, and the black dots represent the pores 27 that absorb the additional electrolyte 28.

Figure 3:
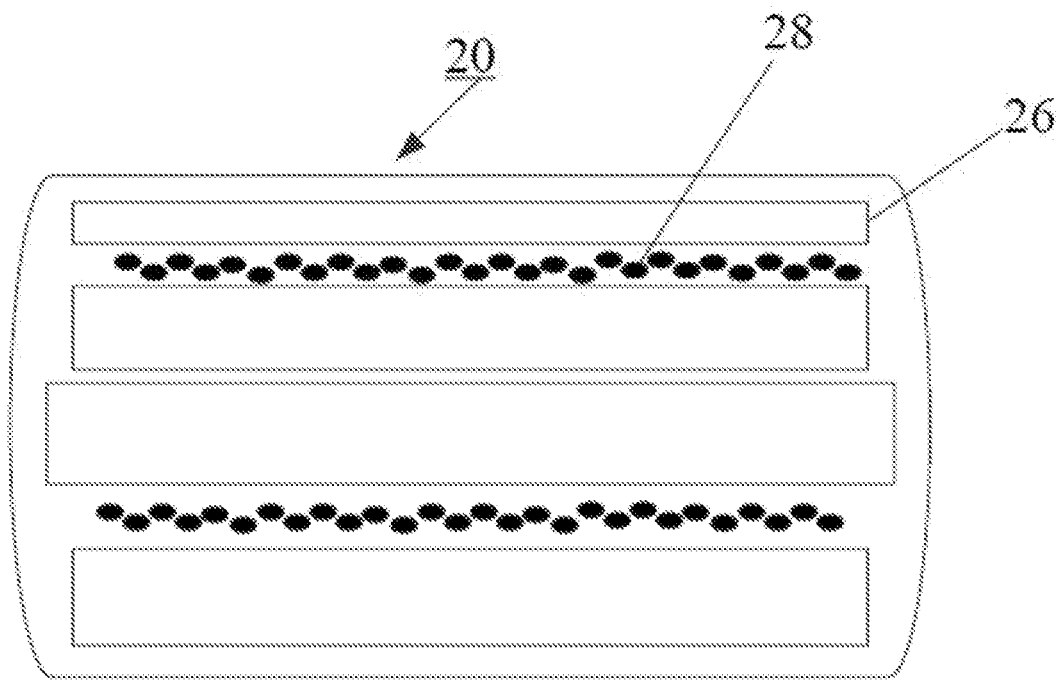
FIG. 3 illustrates an elastic material in a deformed state inside a battery according to some embodiments of the present disclosure.

FIG. 3 illustrates an elastic material in a deformed state inside a battery according to some embodiments of the present disclosure. As shown in FIG. 3, in the battery 20, the additional electrolyte 28 absorbed in the porous elastic material 26 is squeezed out of the pores of the porous elastic material 26 and is blended into the electrolyte contained inside the battery enclosure, thereby replenishing the consumed electrolyte and lithium ions.

Figure 4:
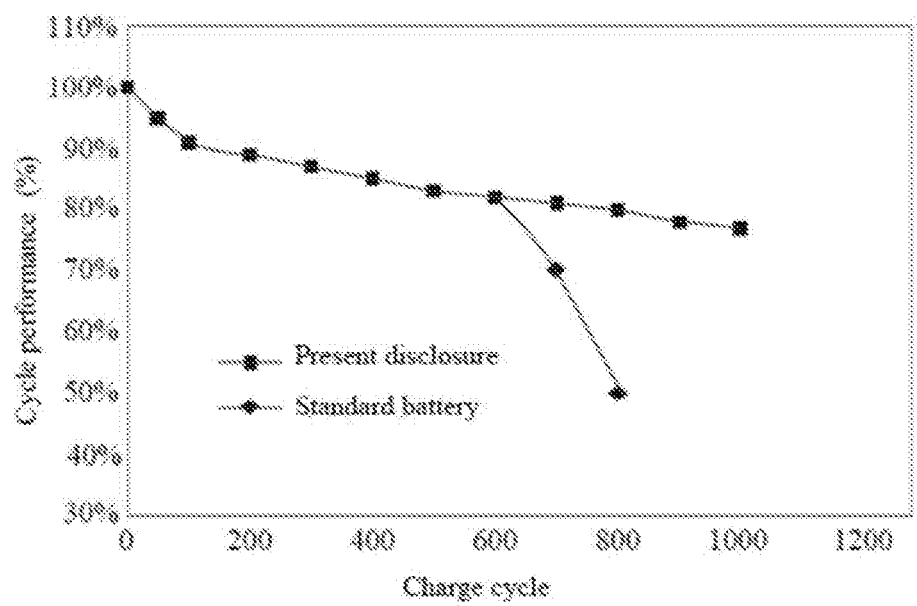
FIG. 4 illustrates a schematic diagram of cycle performance of the battery in FIG. 2.

FIG. 4 illustrates a schematic diagram of cycle performance of the battery in FIG. 2. As shown in FIG. 4, after 600 use cycles, the cycle performance of a standard battery drops from initially 100% to 85%. As the use cycles further increase, the cycle performance drops substantially. After 900 use cycles, the cycle performance drops to 30%. Regarding the battery provided by the embodiments of the present disclosure, after 600 use cycles, the cycle performance drops from initially 100% to 85%. However, as the use cycles further increase, the cycle performance does not drop substantially. After approximately 900 use cycles, the cycle performance merely drops to about 80%. After approximately 1000 use cycles, the cycle performance drops to about 75%. Compared to the standard battery, the cycled battery provided by the embodiments of the present disclosure has better cycle performance, withstands more use cycles, and has a longer battery life.

The battery provided by the embodiments of the present disclosure may effectively restore the battery capacity without compromising the battery energy density. It is easy to operate. The battery does not occupy additional space in the length or width dimension. By controlling the thickness of the absorption layer, the overall thickness of the battery after use meets the specification. The battery energy density is not reduced. No secondary electrolyte injection is required, thereby introducing no additional fabrication difficulty. The fabrication process of the battery is simple and easy to operate. The elastic material is added to absorb the additional electrolyte during the fabrication process of the battery. No secondary electrolyte injection is required. Because the electrolyte is released in real time, the erosion of the electrodes may be avoided. Because the elastic material is added, the deformation problem caused by the uneven stress inside the battery can be effectively alleviated. Because the heat-conductive insulating material is used, the heat inside the battery can be effectively dissipated to the outside of the battery. Further, the battery enclosure may be the heat-conductive metal enclosure such as the prismatic aluminum enclosure or the cylindrical steel enclosure. The metal enclosure having a desirable heat transfer property may effectively improve the heat dissipation, thereby improving the discharging performance and safety of the battery. The battery provided by the embodiments of the present disclosure is suitable for all secondary batteries that consume the electrolyte during the use cycles.

Figure 5:
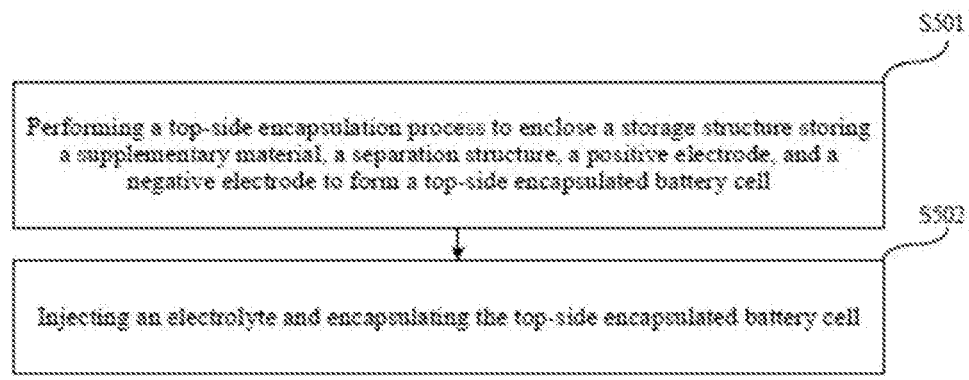
FIG. 5 illustrates a flowchart of an example of a battery fabrication method according to some embodiments of the present disclosure.

The present disclosure also provides a battery fabrication method. The battery fabrication method may be used to fabricate any battery disclosed in the embodiments of the present disclosure. FIG. 5 illustrates a flowchart of an example of a battery fabrication method according to some embodiments of the present disclosure. As shown in FIG. 5, the battery fabrication method includes the following process.

Step S501: performing a top-side encapsulation process to enclose a storage structure storing supplementary material, a separation structure, a positive electrode, and a negative electrode to form a top-side encapsulated battery cell.

The supplementary material is a material containing the same element as the conductive ions of the battery. For example, when the conductive ions of the battery are lithium ions, the supplementary material is the material containing the lithium element.

Step S502: injecting an electrolyte and encapsulating the top-side encapsulated battery cell.

In this case, injecting the electrolyte into the top-side encapsulated battery cell at step S502 may include the following process.

Step S5021: injecting a liquid conductor into the top-side encapsulated battery cell, where the supplementary material can form the same ions as conductive ions in the liquid conductor.

In another embodiment, the method further includes the following process.

Step S511: calculating a volume of the supplementary material absorbed in the storage structure according to a pre-set algorithm.

Step S512: if the volume is approximately equal to a pre-set volume, stopping the storage structure from absorbing more supplementary material.

In this case, the pre-set volume is a pre-set volume of the supplementary material that the storage structure can absorb. The pre-set volume may be determined according to an absorption ability of the storage structure or may be determined according to the performance of the processed battery. For example, if the processed battery is a high-performance battery, the pre-set volume is relatively large. If the processed battery is a general-performance battery, the pre-set volume is relatively small.

Figure 6:
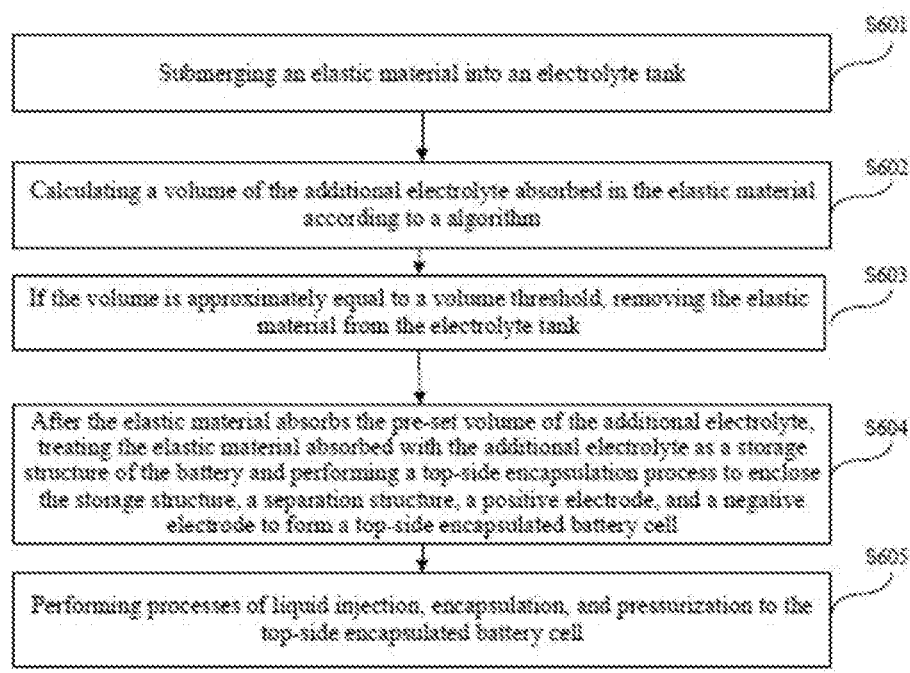
FIG. 6 illustrates a flowchart of another example of a battery fabrication method according to some embodiments of the present disclosure.

FIG. 6 illustrates a flowchart of another example of a battery fabrication method according to some embodiments of the present disclosure. As shown in FIG. 6, the method includes the following process.

Step S601: submerging an elastic material into an electrolyte tank.

In this case, the electrolyte tank contains a certain volume of supplementary material, which is an additional electrolyte.

Step 602: calculating a volume of the additional electrolyte absorbed in the elastic material according to a pre-set algorithm.

Step 603: if the volume is approximately equal to a pre-set volume, removing the elastic material from the electrolyte tank.

In this case, the pre-set volume is a pre-set volume of the supplementary material that the elastic material can absorb. The pre-set volume may be determined according to a volume of the elastic material and an absorption ability of the elastic material or may be determined according to the performance of the processed battery.

Step S604: after the elastic material absorbs the pre-set volume of the additional electrolyte, treating the elastic material absorbed with the additional electrolyte as a storage structure of the battery and performing a top-side encapsulation process to enclose the storage structure, a separation structure, a positive electrode, and a negative electrode to form a top-side encapsulated battery cell.

Step S605: performing processes of liquid injection, encapsulation, and pressurization to the top-side encapsulated battery cell.

Figure 7:
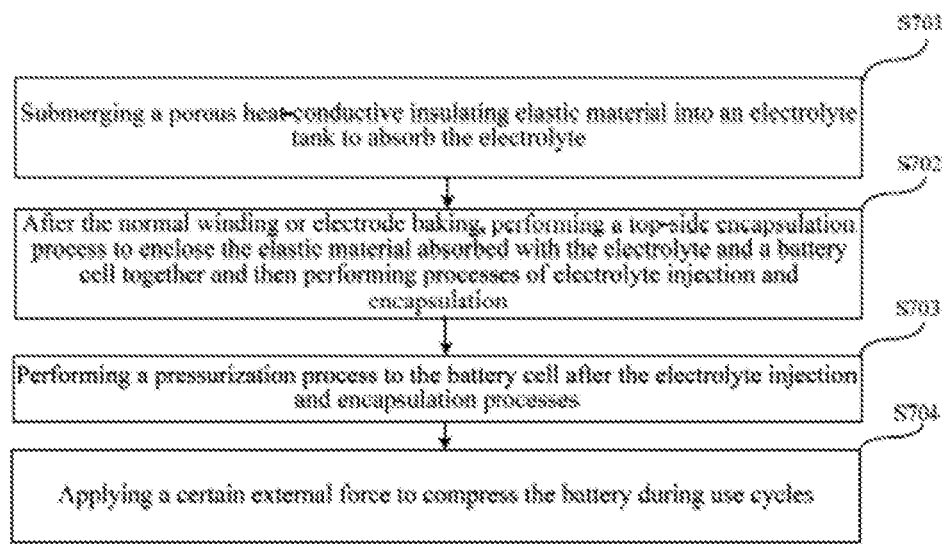
FIG. 7 illustrates a flowchart of another example of a battery fabrication method according to some embodiments of the present disclosure.

FIG. 7 illustrates a flowchart of another example of a battery fabrication method according to some embodiments of the present disclosure. As shown in FIG. 7, the method includes the following process.

Step S701: submerging a porous heat-conductive insulating elastic material into an electrolyte tank to absorb the electrolyte.

In this case, an amount of the absorbed electrolyte can be obtained through calculation and simulation. The length and width of the elastic material may be equal to the length and width of battery electrodes. The thickness of the elastic material depends on a thickness of the completely compressed elastic material subtracted by a natural thickness of battery cell expansion. A sum of the thickness of the compressed elastic material and the thickness of the battery cell expansion may not exceed an expansion specification of the battery cell thickness, such as 8% or 10%.

Step S702: after the normal winding or electrode baking, performing a top-side encapsulation process to enclose the elastic material absorbed with the electrolyte and a battery cell together and then performing processes of electrolyte injection and encapsulation.

Step S703: performing a pressurization process to the battery cell after the electrolyte injection and encapsulation processes.

During the pressurization process, the pressure is controlled not to squeeze out the absorbed electrolyte and at the same time to prevent a redox-generated gas from occupying the pores intended for absorbing the electrolyte.

After the pressurization process, the battery is ready for use together with normal batteries. During the use cycles, the lithium ions in the electrolyte are gradually consumed and the thickness of the electrodes gradually increases to compress the pores in the elastic material. The absorbed electrolyte is gradually squeezed out to replenish the consumed lithium ions, thereby improving the cycle life and restoring the capacity.

Step S704: applying a certain external force to compress the battery during use cycles.

In this case, through compressing the battery by applying the certain external force or other methods, the electrolyte containing the lithium ions is squeezed out of the elastic material to replenish the consumed electrolyte, thereby restoring and improving the cycle performance of the battery.

In the battery fabrication method provided by the embodiments of the present disclosure, the additional electrolyte is added and stored in the elastic material during the battery fabrication process without the need for secondary electrolyte injection. It is easy to operate. Moreover, the method effectively increases the battery life.

It should be understood by those skilled in the art that other structures and functions of the disclosed battery and battery fabrication method are considered known to those skilled in the art and are not described in detail to avoid repetition.

In the description of the present specification, the references to the terms "one embodiment," "some embodiments," "example," "specific example," or "some examples" and the like refer to that specific features, structures, materials, or characteristics described in connection with the embodiments or examples are included in at least one embodiment or one example. In the present specification, the schematic representation of the above terms does not necessarily mean the same embodiment or example. Further, the particular features, structures, materials, or characteristics described may be combined in a suitable manner in one or more embodiments or examples.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure.

What is claimed is:

1. A battery, comprising:
    a separation structure having a resistance greater than a resistance threshold;
    a positive electrode of the battery and a negative electrode of the battery stacked in layers and disposed on two sides of the separation structure;
    a liquid conductor configured to transport conductive ions between the positive electrode and the negative electrode;
    a storage structure, including at least one sealed storage unit, configured to store supplementary material to release into the liquid conductor, the at least one sealed storage unit, stacked in layers and sequentially disposed in a direction of an expansion of the positive electrode and/or the negative electrode during usage of the battery;
    a pointy object disposed corresponding to the direction the positive electrode and/or the negative electrode expand during the usage of the battery in such a way that the pointy object is configured to puncture at least one of the at least one sealed storage unit of the storage structure; and
    an enclosure configured to form an enclosed cavity to accommodate the separation structure, the positive electrode, the negative electrode, the liquid conductor, and the storage structure, and the pointy object.

2. The battery according to claim 1, wherein:
    the liquid conductor is in contact with the positive electrode and the negative electrode.

3. The battery according to claim 1, wherein:
    in response to the expansion of the positive electrode and/or the negative electrode during usage of the battery, the pointy object punctures a first sealed storage unit of the at least one sealed storage unit, causing the storage structure to release a first volume of the supplementary material; and
    as the expansion of the positive electrode and/or the negative electrode continues further, the pointy object punctures a second sealed storage unit of the at least one sealed storage unit, causing the storage structure releases a second volume of the supplementary material at a time interval from the first volume of the supplementary material being released.

4. The battery according to claim 3, wherein:
    the storage structure is made of an insulating elastic material including at least one pore to absorb the supplementary material; and
    when the battery and the storage structure is subject to a gravitational force only, the supplementary material is not released into the liquid conductor.

5. The battery according to claim 1, wherein:
    the supplementary material forms the same ions as the conductive ions.

6. The battery according to claim 1, wherein:
    a thickness of the storage structure satisfies a condition that a compressed thickness when the storage structure is completely compressed corresponds to N times an expanded thickness of the positive electrode and the negative electrode when the positive electrode and the negative electrode are completely expanded, wherein N is greater than or equal to 1.

7. The battery according to claim 1, wherein:
    the storage structure is disposed at any position in a direction the positive electrode or the negative electrode expands.

8. The battery according to claim 1, wherein the expansion of the positive electrode and/or the negative electrode causes a compression on the storage structure, resulting in a real time release of the supplementary material replenishing the conductive ions.

* * * * *